US012251806B2

(12) United States Patent
Huo et al.

(10) Patent No.: US 12,251,806 B2
(45) Date of Patent: Mar. 18, 2025

(54) UNDERWATER AIR TACKER

(71) Applicant: 4B DREAM Co., Ltd., Jangseong-gun (KR)

(72) Inventors: Kwan Huo, Gwangju (KR); Jung Jae Cho, Gwangju (KR); Sang Jeong, Seoul (KR)

(73) Assignee: 4B DREAM CO., LTD., Jangseong-gun (KR)

( * ) Notice: Subject to any disclaimer, the term of this patent is extended or adjusted under 35 U.S.C. 154(b) by 0 days.

(21) Appl. No.: 18/569,881

(22) PCT Filed: Oct. 12, 2022

(86) PCT No.: PCT/KR2022/015324
§ 371 (c)(1),
(2) Date: Dec. 13, 2023

(87) PCT Pub. No.: WO2023/085614
PCT Pub. Date: May 19, 2023

(65) Prior Publication Data

US 2024/0278400 A1 Aug. 22, 2024

(30) Foreign Application Priority Data

Nov. 9, 2021 (KR) ........................ 10-2021-0152861

(51) Int. Cl.
*B25C 1/04* (2006.01)
*B25C 7/00* (2006.01)

(52) U.S. Cl.
CPC . *B25C 1/04* (2013.01); *B25C 7/00* (2013.01)

(58) Field of Classification Search
CPC .... B25C 1/04; B25C 7/00; B25C 1/10; B25C 1/12; B25C 1/123; B25C 1/143;
(Continued)

(56) References Cited

U.S. PATENT DOCUMENTS 4,060,188 A * 11/1977 Monson .................... B25C 1/18
227/9
4,505,018 A * 3/1985 Regalbuto ................. F41C 9/06
411/441

FOREIGN PATENT DOCUMENTS

CN 206029777 U 3/2017
JP H10277964 A 10/1998
(Continued)

OTHER PUBLICATIONS

International search report of PCT/KR2022/015324, Jan. 20, 2023, English translation.

*Primary Examiner* — Veronica Martin
(74) *Attorney, Agent, or Firm* — STIP Law Group, LLC

(57) ABSTRACT

An underwater air tacker (T) according to the present invention comprises: a water infiltration prevention means (1) which prevents water from infiltrating into a hammer operating means (100); an exhaust cover (2) preventing the water from flowing in; a compressed air discharge valve (3) preventing the water from flowing in; and a piston front-air discharge means (4). According to the underwater air tacker (T) having the above structure according to the present invention, when a marine collision accident occurs or a vessel faces a risk of sinking, a diver can rapidly repair a hole in the vessel underwater. Thus, damage caused by oil spill may be minimized, and loss of lives and property caused by the sinking of vessels can be prevented.

3 Claims, 10 Drawing Sheets

(58) Field of Classification Search
CPC ......... B25C 5/1693; B63C 11/52; B63C 7/22; Y10T 29/53839; Y10T 29/49833; E04D 2015/045; E04D 15/04
See application file for complete search history.

(56) References Cited

FOREIGN PATENT DOCUMENTS

| | | | |
|---|---|---|---|
| JP | 2000006050 | A | 1/2000 |
| JP | 2002160178 | A | 6/2002 |
| KR | 200366088 | Y1 | 11/2004 |
| KR | 200392428 | Y1 | 8/2005 |
| KR | 102341113 | B1 | 12/2021 |

* cited by examiner

UNDERWATER AIR TACKER

CROSS-REFERENCE TO RELATED APPLICATIONS

This application is the U.S. National Phase under 35 U.S.C. § 371 of International Application No. PCT/KR2022/015324, filed on Oct. 12, 2022, which in turn claims the benefit of Korean Application No. 10-2021-0152861, filed on Nov. 9, 2021, the disclosures of which are incorporated by reference into the present application.

TECHNICAL FIELD

The present invention relates to an underwater air tacker capable of operating underwater.

BACKGROUND ART

In general, an air tacker used for a construction and design work is a pneumatic device used for coupling wood and wood, wood and plastic, wood and steel, and wood and concrete. The air tacker is used for various works such as interior and exterior design works and aluminum sash works.

The air tacker typically includes a body having a cylinder and a piston therein, a body cover disposed at a rear end of the body, a magazine attached to a lower end of a front portion of the body and loading a plurality of tacker pins, a guide mounted on an upper end of the magazine and connected to the front portion of the body to guide the tacker pins that are sequentially ascended in the magazine by compressed air when firing, a trigger installed on an outer lower portion of the body by an operation of a user, and a safety device installed parallel to the guide and connected to a front portion of the trigger for safety during operation.

However, the typical air tacker has a problem in that water is infiltrated into the air tacker when working underwater, so that the air tacker is not operated.

Accordingly, when a hole is made in a bottom of a ship and oil is leaked due to a ship collision accident or ship deterioration, or when the damaged ship is about to sink, a wood plate needs to be placed to the hole and then fixed. However, since there is no suitable means for fixing the wood plate, a scale of damage may not be reduced.

Thus, the “AIR TACKER” of Korean Patent Application No. “20-2005-0014297” has been applied and registered as a related art of the present invention. The air tacker includes a body having a cylinder and a piston therein, a body cover formed at a rear end of the body, a magazine attached to a lower end of a front portion of the body and loading a plurality of tacker pins, a guide mounted to an upper end of the magazine and connected to the front portion of the body to guide the tacker pins that are sequentially ascended in the magazine by compressed air when firing, a trigger installed on an outer lower portion of the body by an operation of a user, and a safety device connected to a front portion of the trigger for safety during operation.

DISCLOSURE OF THE INVENTION

Technical Problem

The present invention provides an underwater air tacker capable of operating underwater to quickly respond to an oil spill accident or a ship sinking accident in order to solve the above-described problem.

Technical Solution

An embodiment of the present invention provides an underwater air tacker T including: a hammer operating means 100 including a cylinder 101 therein, a piston 102 installed in the cylinder 101 and reciprocating linearly in the cylinder 101, and a hammer 103 having a bar shape in which a rear end is fixed and coupled to a front surface of the piston 102 to reciprocate linearly along the piston 102, wherein the piston 102 and the hammer 103 are moved forward by using driving force of compressed air introduced into the cylinder 101 from the outside when an attached trigger 104 is pulled, and a front end of the hammer 103 is exposed to the outside through a hammer through-hole 105 defined in a front surface to hit a rear end of a tacker pin disposed in front of the hammer through-hole 105; a rear cover 300 mounted to a rear end of the hammer operating means 100 and having a compressed air outlet 301 so that the compressed air that moves the piston 102 forward is discharged to the outside of the hammer operating means 100; a magazine 500 which is mounted to the hammer operating means 100 and in which the tacker pin is stored; and a guide means 700 installed in front of the hammer through-hole 105 to align the tacker pin in front of the hammer through-hole 105 so that the tacker pin supplied from the magazine 500 is hit and fired by the forwardly moved hammer 103, the underwater air tacker T further including: a water infiltration prevention means 1 that is a rubber O-ring installed in the hammer through-hole 105 to prevent water from infiltrating into the hammer operating means 100 through the hammer through-hole 105 while allowing the hammer 103 to pass therethrough; a water infiltration prevention exhaust cover 2 mounted to a rear surface of the rear cover 300 and having at least two exhaust holes 21 so that the compressed air discharged through the compressed air outlet 301 is exhausted; a compressed air discharge valve 3 mounted in the exhaust hole 21 to prevent the water from flowing in through the exhaust holes 21 by opening the exhaust hole 21 to discharge the compressed air above a predetermined pressure when the compressed air above a predetermined pressure is discharged through the compressed air outlet 301 and closing the discharge holes 21 when a pressure of the compressed air discharged through the compressed air outlet 301 is reduced below a predetermined pressure; and a piston front-air discharge means 4 configured to allow the piston 102 to be moved forward smoothly by transferring air in the cylinder 101 disposed in front of the piston 102 into the water infiltration prevention exhaust cover 2 when the piston 102 is moved forward by a driving force of the compressed air.

In an embodiment, the exhaust hole 21 may include: a main exhaust hole 211 formed in the water infiltration prevention exhaust cover 2 so that the compressed air is discharged therethrough; a compressed air discharge valve fixing hole 212 which is formed with a predetermined depth in a rear surface of the water infiltration prevention exhaust cover 2, formed concentrically with the main exhaust hole 211, and has a diameter greater than that of the main exhaust hole 211 and in which the compressed air discharge valve 3 configured to open or close the main exhaust hole 211 is mounted, the compressed air discharge valve fixing hole 212 configured to discharge the compressed air discharged from the main exhaust hole 211 to the outside of the water infiltration prevention exhaust cover 2; and an annular protrusion 213 formed on a boundary line between the main exhaust hole 211 and the compressed air discharge valve fixing hole 212.

In an embodiment, the piston front-air discharge means 4 may include: an input connector 41 that is an air transfer pipe having an inlet and an outlet, the input connector 41 installed on the hammer operating means 100 and having the inlet configured to communicate with the inside of the cylinder 101 disposed in front of the piston 102; an output connector 42 that is an air transfer pipe having an inlet and an outlet, the output connector 42 installed on the water infiltration prevention exhaust cover 2 and having the outlet configured to communicate with the inside of the water infiltration prevention exhaust cover 2; and an air transfer means 43 that is a pipe having an inlet and an outlet, the air transfer means 43 having the inlet connected to the outlet of the input connector 41 and the outlet connected to the inlet of the output connector 42 to transfer air in the cylinder 101 transferred through the input connector 41 to the output connector 42.

Advantageous Effects

The underwater air tacker having the above-described structure according to the present invention may allow a diver to rapidly repair the hole in the ship underwater when the hole is made in the ship due to a marine collision accident or ship deterioration to cause oil spill or ship sinking. Thus, the damage caused by the oil spill may be minimized, and the damage of human and the property damage caused by the ship sinking may be prevented.

DESCRIPTION OF REFERENCE NUMERALS

Figure 1:
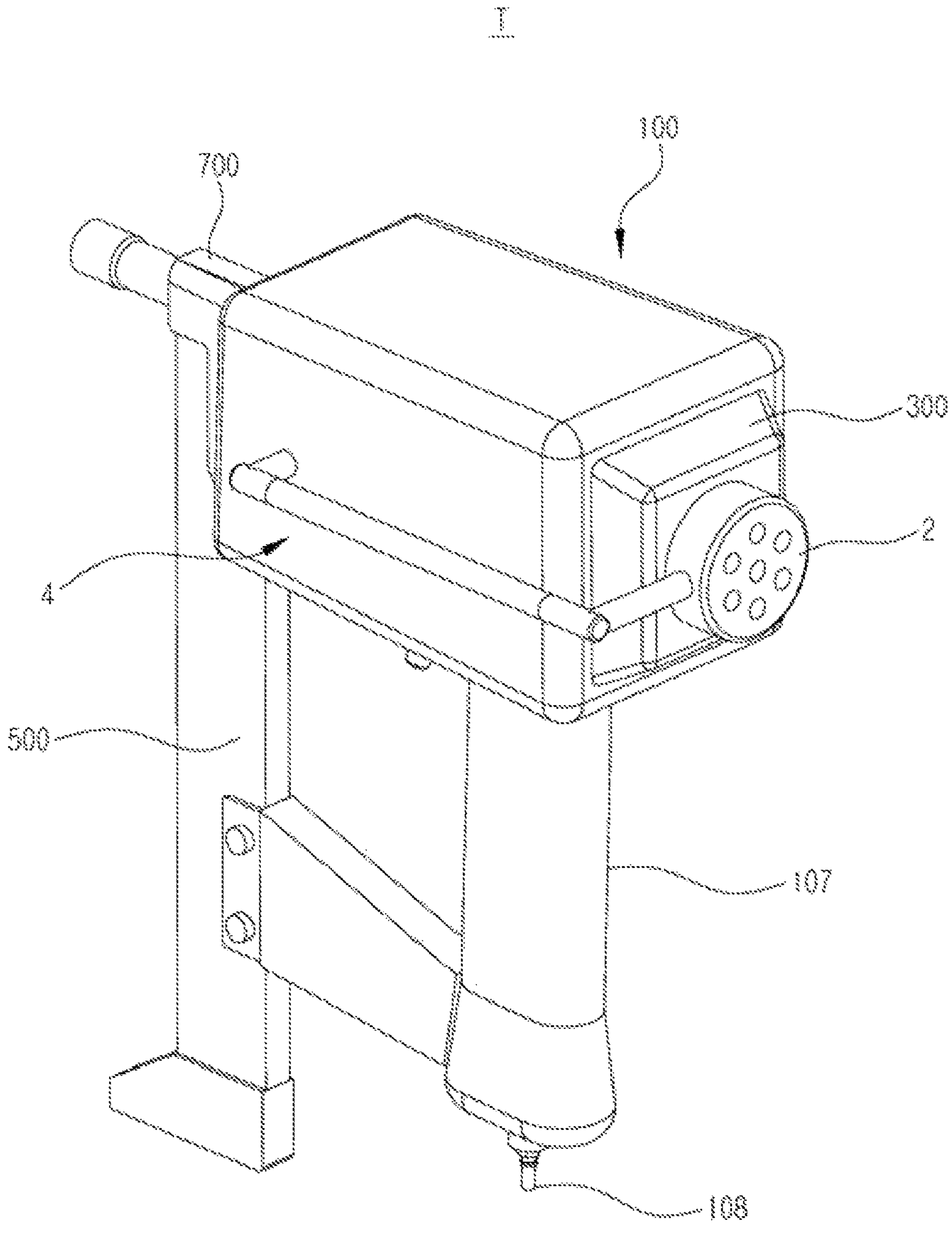
FIG. 1 is a coupled perspective view of the present invention.

| | |
|---|---|
| 100: Hammer operating means | 101: Cylinder |
| 102: Piston | 103: Hammer |
| 104: Trigger | 105: Hammer through-hole |
| 106: Body case | 107: Handle |
| 108: Air plug | 109: Cylinder fixing member |
| 110: Head valve | 111: Elastic member for supporting head valve |
| 112: First space | 113: First compressed air introduction passage |
| 114: Second space | 115: Second compressed air introduction passage |
| 116: Trigger valve | 117: Cylinder discharge hole |
| 118: Third space | |
| 300: Rear cover | 301: Compressed air outlet |

-continued

| | |
|---|---|
| 500: Magazine | 700: Tacker pin guide means |
| T: Underwater air tacker | 1: Water infiltration prevention means |
| 2: Water infiltration prevention exhaust cover | 21: Exhaust hole |
| 211: Main exhaust hole | 212: Compressed air discharge valve fixing hole |
| 213: Annular protrusion | 3: Compressed air discharge valve |
| 31: Assistant separation prevention means | 311: Compressed air discharge hole |
| 32: Opening and closing ball | 33: Elastic member |
| 4: Piston front-air discharge means | 41: Inlet connector |
| 42: Outlet connector | 43: Air transfer means |

MODE FOR CARRYING OUT THE INVENTION

Hereinafter, the present invention will be described in detail with reference to the accompanying drawings.

As illustrated in FIGS. 1 to 5, an underwater air tacker T according to the present invention includes: a hammer operating means 100 including a cylinder 101 therein, a piston 102 installed in the cylinder 101 and reciprocating linearly in the cylinder 101, and a hammer 103 having a bar shape in which a rear end is fixed and coupled to a front surface of the piston 102 to reciprocate linearly along the piston 102, in which the piston 102 and the hammer 103 are moved forward by using driving force of compressed air infiltrated into the cylinder 101 from the outside when an attached trigger 104 is pulled, and a front end of the hammer 103 is exposed to the outside through a hammer through-hole 105 defined in a front surface to hit a rear end of a tacker pin disposed in front of the hammer through-hole 105; a rear cover 300 mounted to a rear end of the hammer operating means 100 and having a compressed air outlet 301 so that the compressed air that moves the piston 102 forward is discharged to the outside of the hammer operating means 100; a magazine 500 which is mounted to the hammer operating means 100 and in which the tacker pin is stored; and a guide means 700 installed in front of the hammer through-hole 105 to align the tacker pin in front of the hammer through-hole 105 so that the tacker pin supplied from the magazine 500 is hit and fired by the forwardly moved hammer 103, and the underwater air tacker T further includes: a water infiltration prevention means 1 that is a rubber O-ring installed in the hammer through-hole 105 to prevent water from infiltrating into the hammer operating means 100 through the hammer through-hole 105 while allowing the hammer 103 to pass therethrough; a water infiltration prevention exhaust cover 2 mounted to a rear surface of the rear cover 300 and having at least two exhaust holes 21 so that the compressed air discharged through the compressed air outlet 301 is exhausted; a compressed air discharge valve 3 mounted in the exhaust hole 21 to prevent the water from flowing in through the exhaust holes 21 by opening the exhaust hole 21 to discharge the compressed air above a predetermined pressure when the compressed air above a predetermined pressure is discharged through the compressed air outlet 301 and closing the discharge holes 21 when a pressure of the compressed air discharged through the compressed air outlet 30 is reduced below a predetermined pressure; and a piston front-air discharge means 4 configured to allow the piston 102 to be moved forward smoothly by transferring air in the cylinder 101 disposed in front of the piston 102 into the water infiltration prevention exhaust cover 2 when the piston 102 is moved forward by a driving force of the compressed air.

Figure 2:
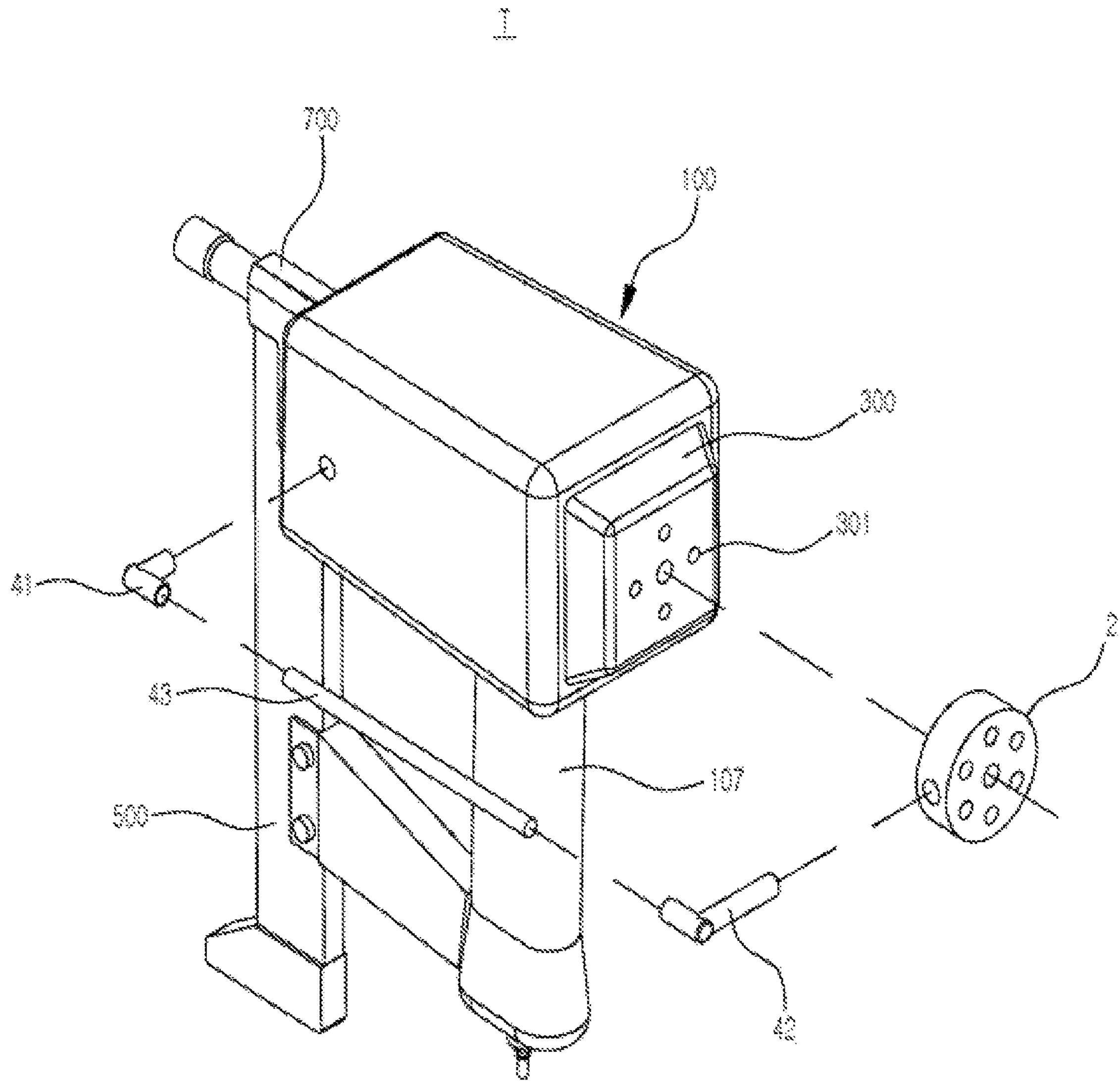
FIG. 2 is an exploded perspective view of the present invention.
Figure 3A:
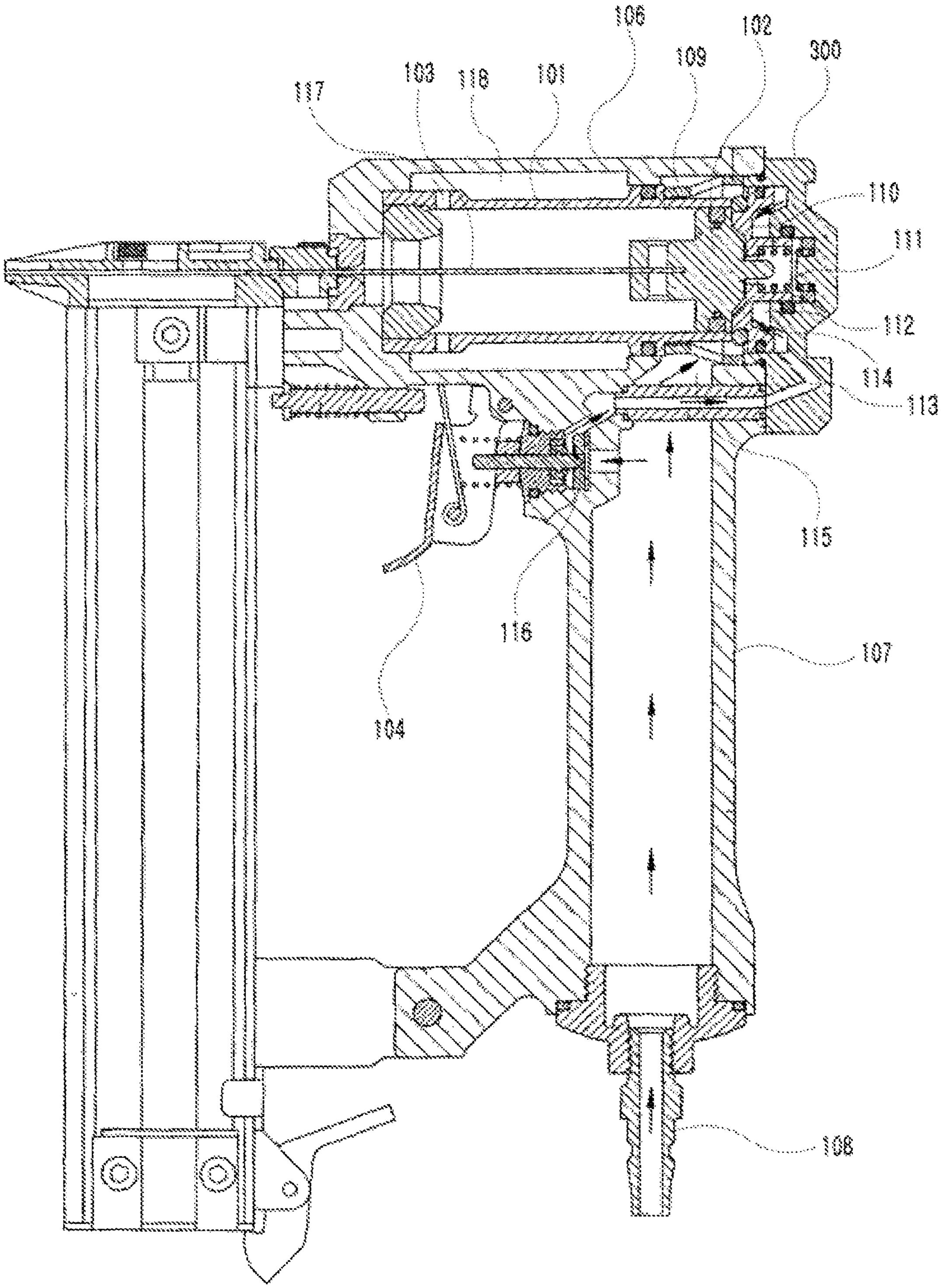
FIG. 3*a* is a view for explaining an operating state of a hammer operating means before a trigger mounted to the hammer operating means is pulled.
Figure 3B:
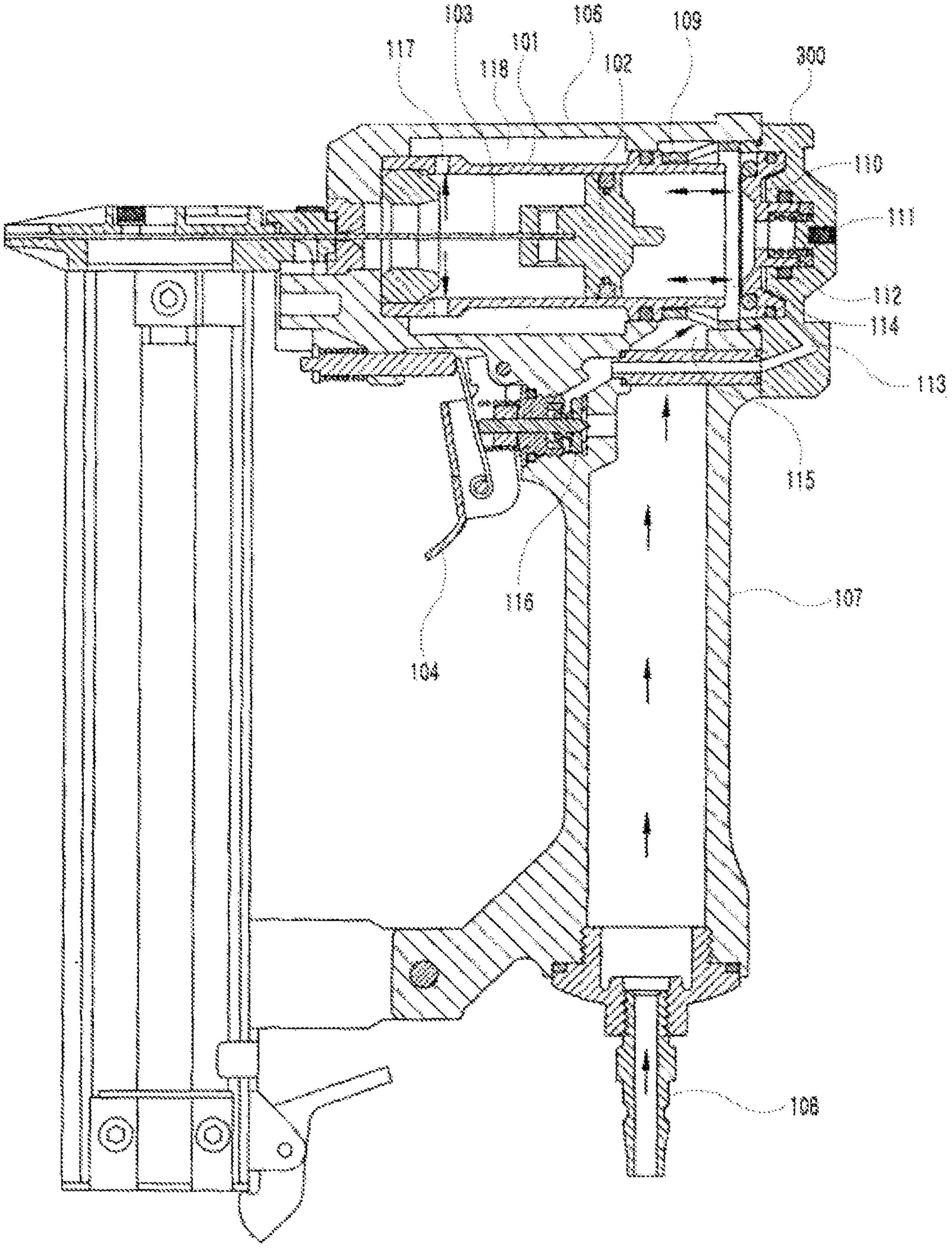
FIGS. 3*b* and 3*c* are views for explaining an operating state of the hammer operating means when the trigger mounted to the hammer operating means is pulled.
Figure 3C:
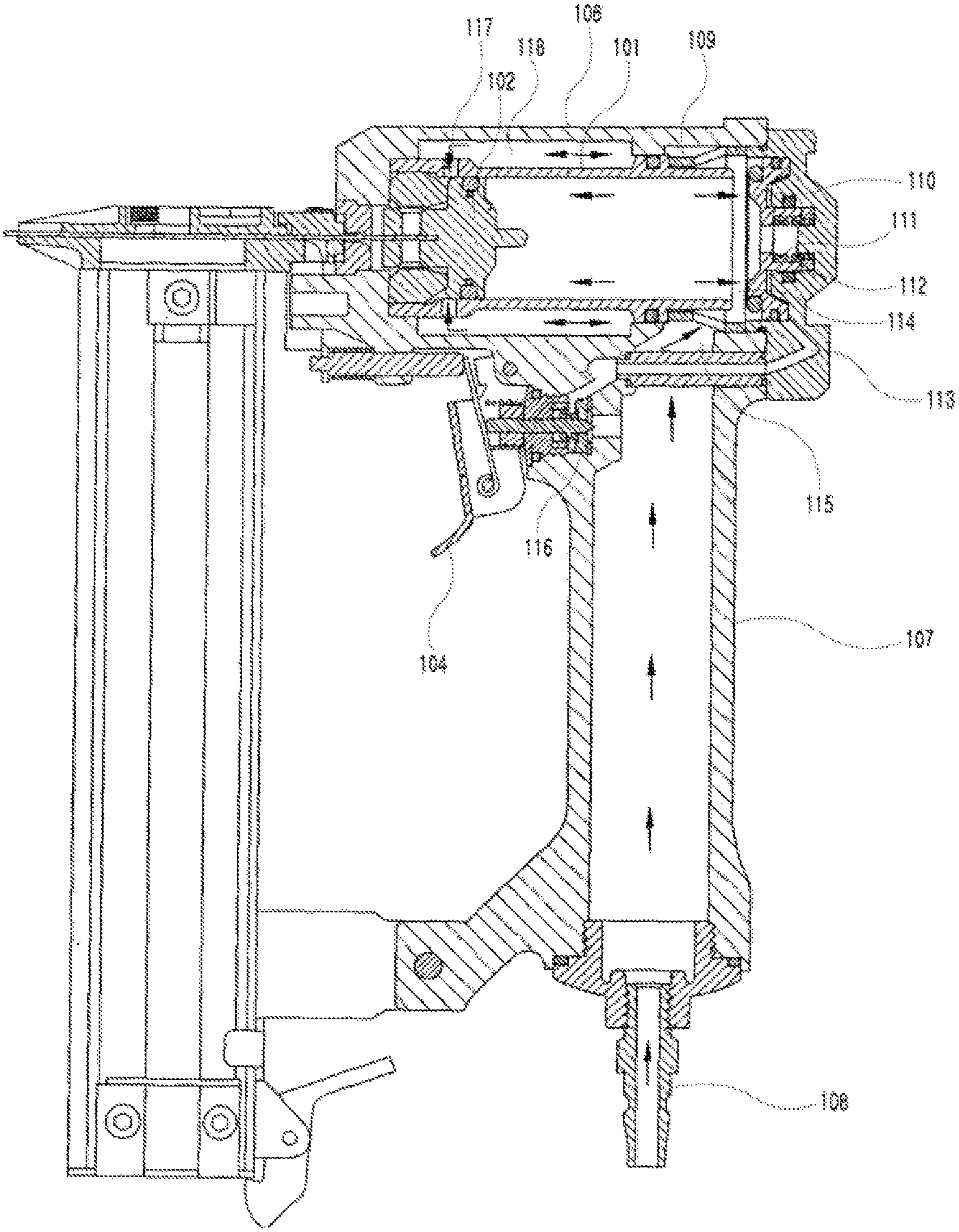
Figure 3D:
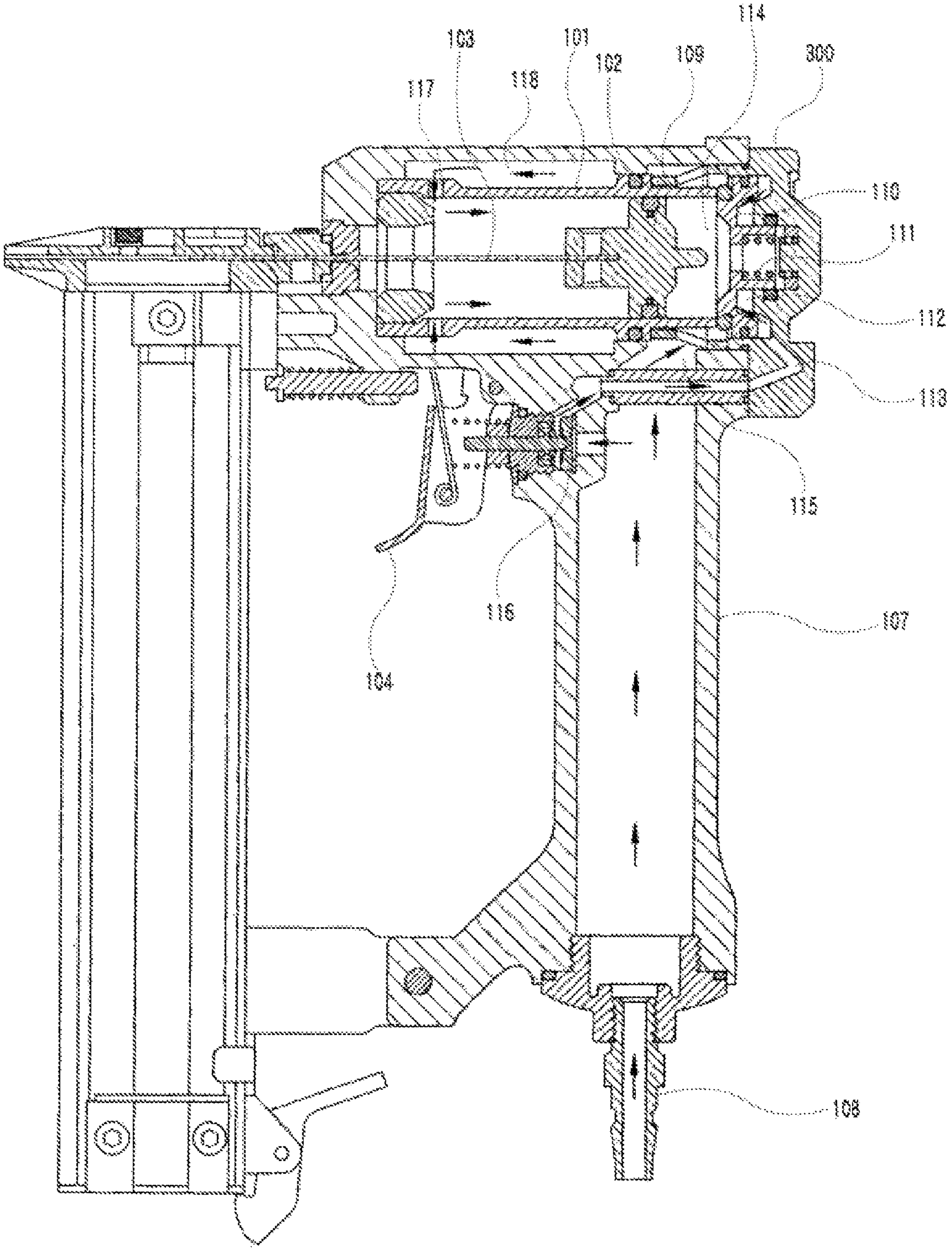
FIG. 3*d* is a view for explaining an operating state of the hammer operating means when the pulled trigger is released.
Figure 4:
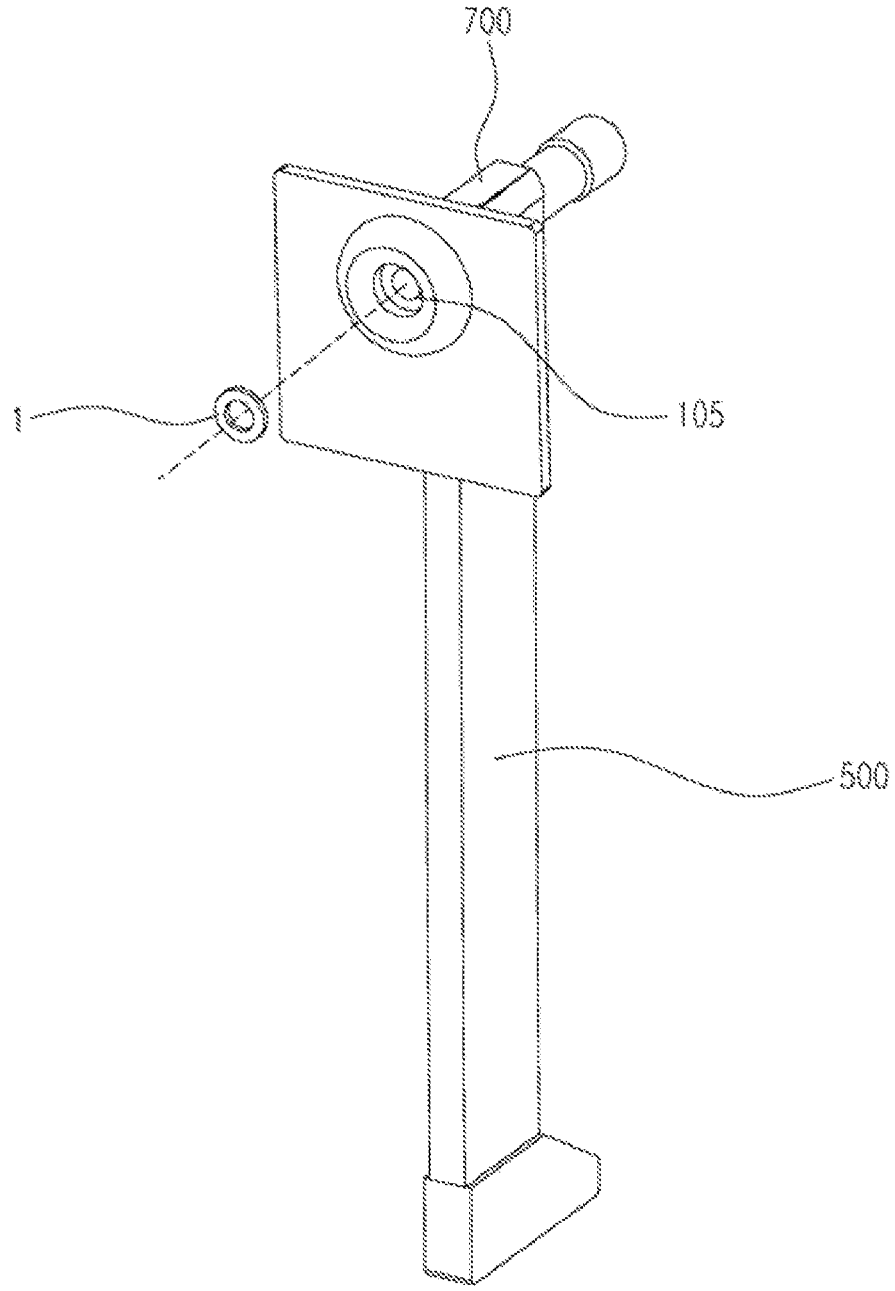
FIG. 4 is a view illustrating a water infiltration prevention means mounted to a hammer through-hole.

As illustrated in FIG. 2, the piston front-air discharge means 4 includes: an input connector 41, as an air transfer pipe having an inlet and an outlet, installed on the hammer operating means 100 and having the inlet configured to communicate with the inside of the cylinder 101 disposed in front of the piston 102; an output connector 42, as an air transfer pipe having an inlet and an outlet, installed on the water infiltration prevention exhaust cover 2 and having the outlet configured to communicate with the inside of the water infiltration prevention exhaust cover 2; and an air transfer means 43, as a pipe having an inlet and an outlet, having the inlet connected to the outlet of the input connector 41 and the outlet connected to the inlet of the output connector 42 to transfer air in the cylinder 101 transferred through the inlet connector 41 to the outlet connector 42.

Each of the input connector 41 and the output connector 42 is bent into a "¬"—shape.

An operating principle of the hammer operating means 100 will be described in detail with reference to FIGS. 3*a* to 3*d* to help understanding.

As illustrated in FIGS. 3*a* to 3*d*, the hammer operating means 100 includes: a body case 106 in which the cylinder 101 is accommodated and the rear cover 300 is mounted to a rear end thereof, a handle 107 communicated with the inside of the body case 106; an air plug 108 mounted to the handle 107 and injecting compressed air transferred from the outside of the handle 107 into the handle 107; a cylinder fixing member 109 mounted between the cylinder 101 and the rear cover 300 to prevent the cylinder 101 from moving while allowing the compressed air to pass therethrough; ahead valve 110 mounted between the cylinder 101 and the rear cover 300; an elastic member 111 for supporting the head valve, which is mounted between the head valve 110 and the rear cover 300 to push the head valve 110 toward the cylinder 101; a first compressed air introduction passage 113 that transfers the compressed air to a first space 112 formed between the head valve 110 and the rear cover 300; a second compressed air introduction passage 115 that transfers the compressed air to a second space 114 formed between the piston 102 and the head valve 110 through the cylinder fixing member 109; a trigger valve 116 connected with the trigger 104 to block an inlet of the first compressed air introduction passage 113 when the trigger 104 is pulled, thereby preventing the compressed air from flowing into the first compressed air introduction passage 113; a cylinder discharge hole 117 formed on an outer circumferential surface of the cylinder 101; and a third space 118 which is formed between the cylinder 101 and the body case 106 and into which air discharged through the cylinder exhaust hole 117 is introduced when the piston 102 is moved forward.

As illustrated in FIGS. 3*a* to 3*d*, in the hammer operating means 100, when the trigger 104 is not pulled by an operator, an elastic force of the elastic member 111 for supporting the head valve and the compressed air introduced into the first space 112 push the head valve 110 toward the cylinder 101. Accordingly, the compressed air may not be introduced into the second space 114, and the hammer 103 integrated with the piston 102 may not be moved forward.

On the other hand, when the operator pulls the trigger 104, the compressed air introduced into the first space 112 is blocked, and the compressed air introduced into the second compressed air introduction passage 115 is introduced into the second space 114 while pushing the head valve 110 by using a pneumatic pressure.

Also, the compressed air introduced into the second space 114 moves the piston 102 integrated with the hammer 103 forward.

Also, the compressed air introduced into the second space 114 passes through the head valve 110 and then is discharged through the compressed air outlet 301 formed in the rear cover 300.

Also, when the piston 102 is moved forward, the air in the cylinder 101 disposed in front of the piston 102 is introduced into the third space 118 and the water infiltration prevention exhaust cover 2.

On the other hand, when the operator releases the trigger 104, the compressed air is introduced into the first space 112, and at the same time, the compressed air introduced into the second space 114 is blocked. Also, the compressed air in the third space 118 pushes the piston 102 to an original position thereof in a backward direction of the cylinder 101.

Figure 5:
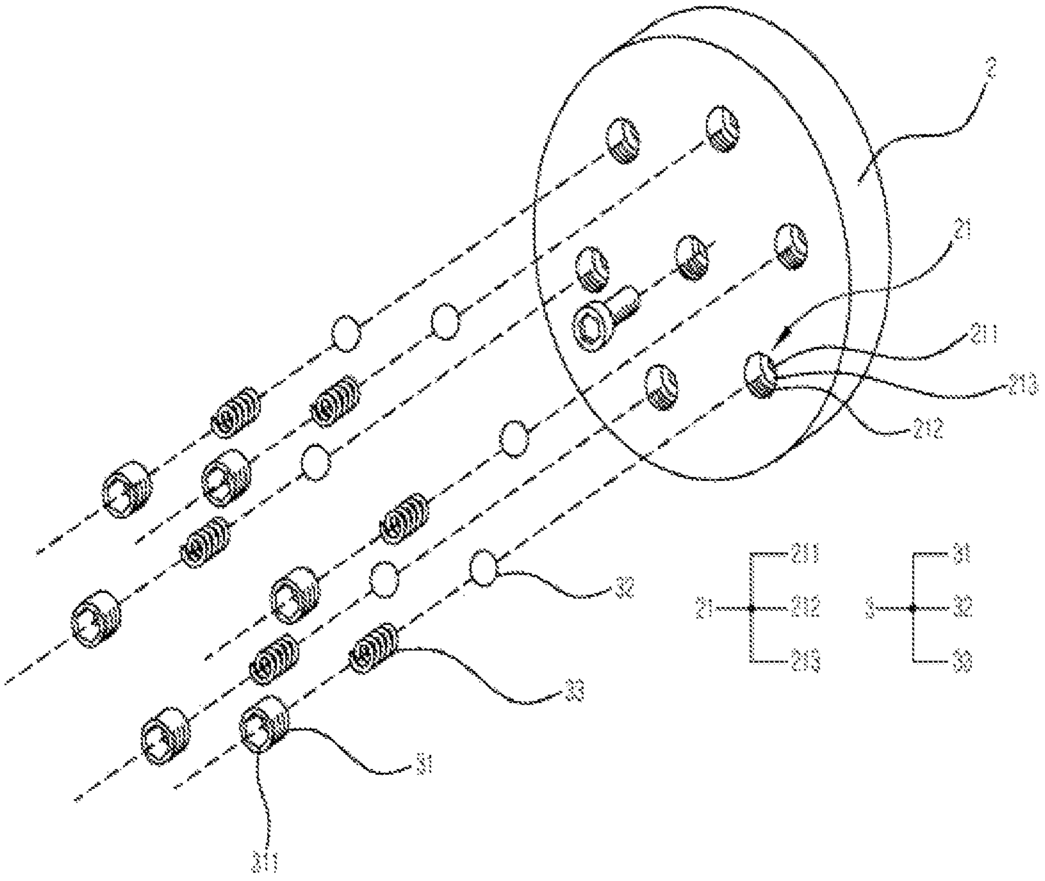
FIG. 5 is a view illustrating a compressed air discharge valve mounted to a water infiltration prevention exhaust cover.
Figure 6A:
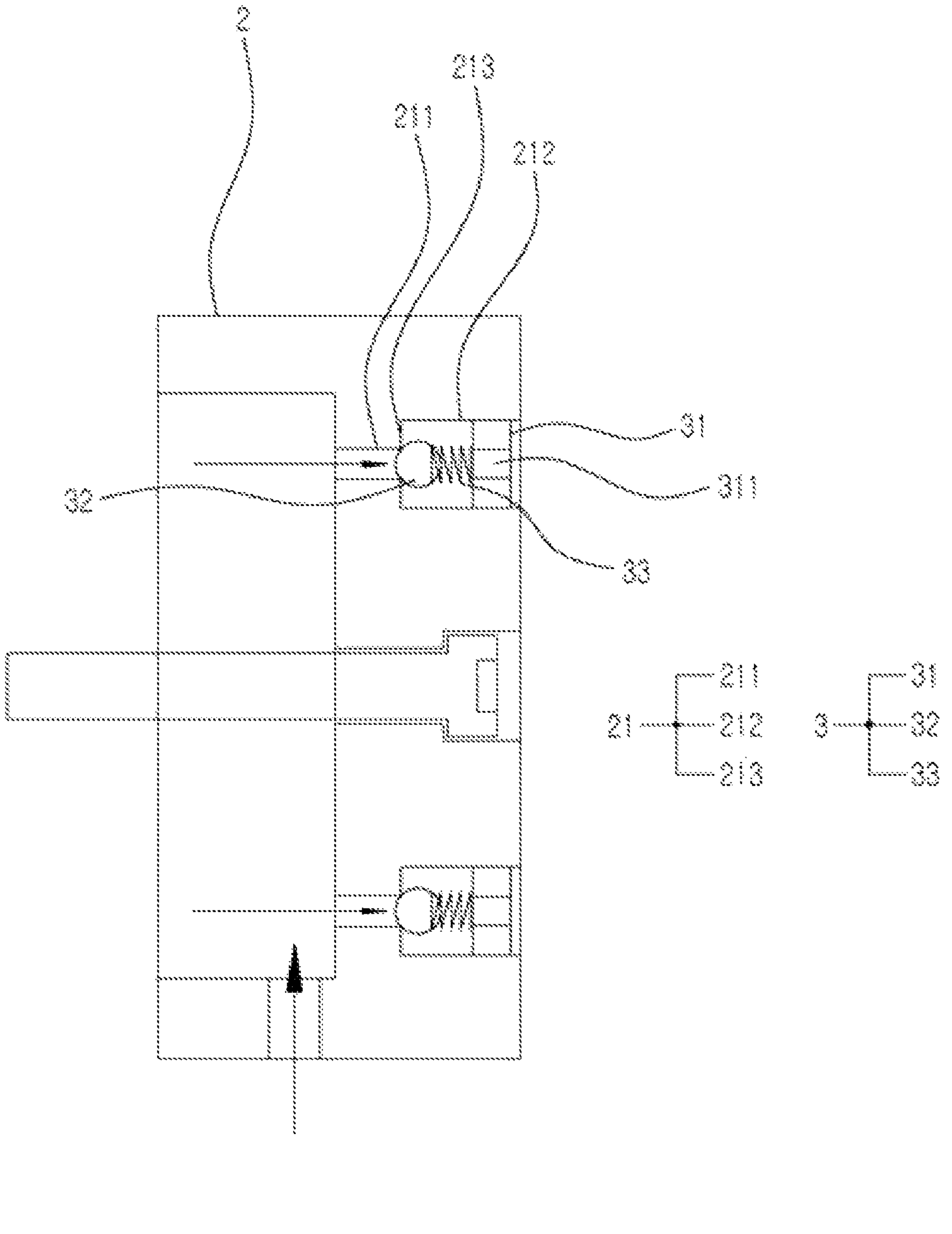
FIGS. 6*a* and 6*b* are views for explaining an operating process of the compressed air discharge valve according to the present invention when a piston is moved forward after the trigger of the hammer operating means is pulled.
Figure 6B:
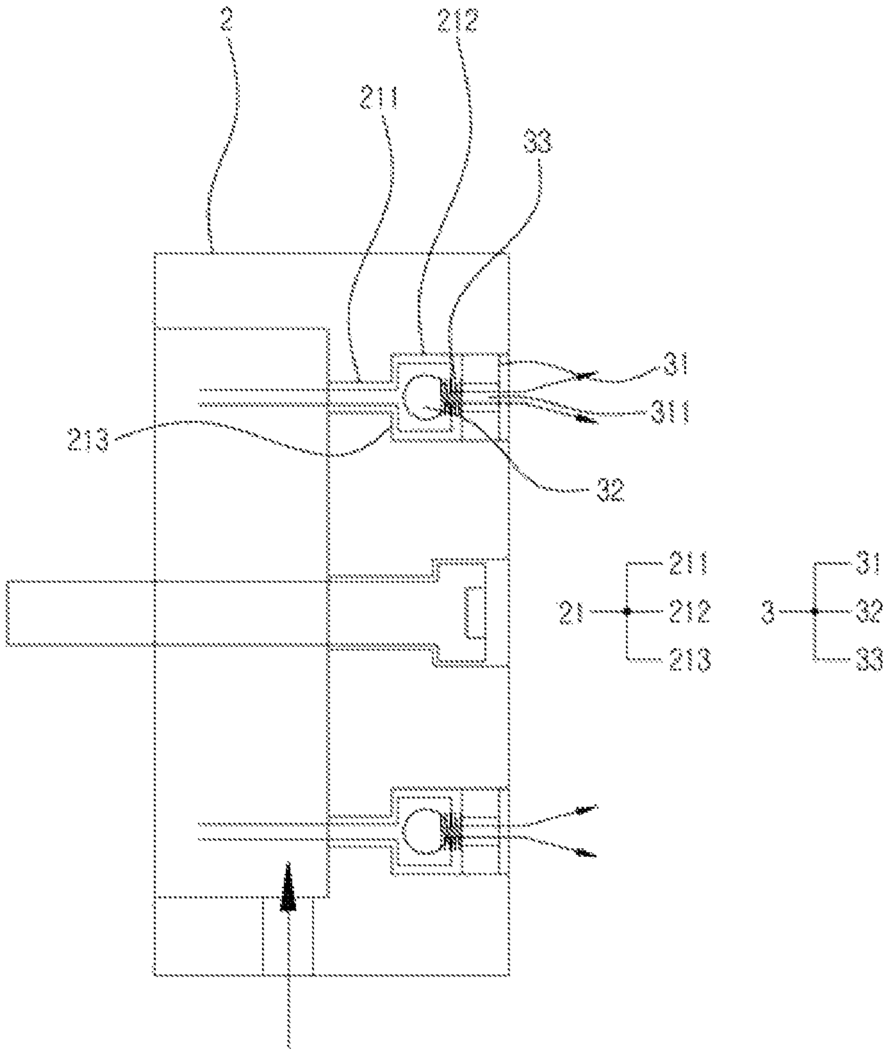

As illustrated in FIG. 5, two or more exhaust holes 21 are circularly arranged around the water infiltration prevention exhaust cover 2.

As illustrated in FIG. 5, the exhaust hole 21 includes: a main exhaust hole 211 formed in the water infiltration prevention exhaust cover 2 so that the compressed air is discharged therethrough; a compressed air discharge valve fixing hole 212 which is formed with a predetermined depth in a rear surface of the water infiltration prevention exhaust cover 2, formed concentrically with the main exhaust hole 211, and has a diameter greater than that of the main exhaust hole 211 and in which the compressed air discharge valve 3 configured to open or close the main exhaust hole 211 is mounted, the compressed air discharge valve fixing hole 212 configured to discharge the compressed air discharged from the main exhaust hole 211 to the outside of the water infiltration prevention exhaust cover 2; and an annular protrusion 213 formed on a boundary line between the main exhaust hole 211 and the compressed air discharge valve fixing hole 212.

As illustrated in FIG. 5, the compressed air discharge valve 3 includes: an assistant separation prevention means 31 which is fixed in the compressed air discharge valve fixing hole 212 and communicated with the main exhaust hole 211 and through which a compressed air discharge hole 311 through which the compressed air transferred from the main exhaust hole 211 passes; an opening and closing ball 32, as a spherical ball having a diameter greater than that of the main exhaust hole 211 and less than that of the compressed air discharge valve fixing hole 212, mounted between the main exhaust hole 211 and the assistant separation prevention means 31; and an elastic member 33 mounted between the assistant separation prevention means 31 and the opening and closing ball 32 and elastically pushing the opening and closing ball 32 toward the main exhaust hole 211 in a state in which a rear end thereof contacts a front end of the assistant separation prevention means 31. When a force by which the compressed air discharged from the main exhaust hole 211 pushes the opening and closing ball 32 toward the assistant separation prevention means 31 is greater than an elastic force of the elastic member 33, the elastic member 33 is contracted, the opening and closing ball 32 is moved toward the assistant separation prevention means 31, and the compressed air is discharged through the main exhaust hole 211. When the force by which the compressed air discharged from the main exhaust hole 211 pushes the opening and closing ball 32 toward the assistant separation prevention means 31 is less than the elastic force of the elastic member 33, the contracted elastic member 33 is expanded to push the opening and closing ball 32 toward the main exhaust hole 211, thereby preventing water infiltration.

The elastic member 33 is a compressed spring and has a diameter less than that of the sphere.

The compressed air discharge hole 311 has a hexagonal cross-section, and the assistant separation prevention means 31 is screw-coupled to an inner circumferential surface of the compressed air discharge valve fixing hole 212.

The underwater air tacker T having the above-described structure according to the present invention may allow a diver to rapidly repair the hole in the ship underwater when the hole is made in the ship due to a marine collision accident or ship aging to cause oil spill or ship sinking. Thus, the damage caused by the oil spill may be minimized, and the damage of human and the property damage caused by the ship sinking may be prevented.

The invention claimed is:

1. An underwater air tacker (T) comprising:

a hammer operating means (100) comprising a cylinder (101) therein, a piston (102) installed in the cylinder (101) and reciprocating linearly in the cylinder (101), and a hammer (103) having a bar shape in which a rear end is fixed and coupled to a front surface of the piston (102) to reciprocate linearly along the piston (102), wherein the piston (102) and the hammer (103) are moved forward by using a driving force of compressed air introduced into the cylinder (101) from the outside when an attached trigger (104) is pulled, and a front end of the hammer (103) is exposed to the outside through a hammer through-hole (105) defined in a front surface to hit a rear end of a tacker pin disposed in front of the hammer through-hole (105);

a rear cover (300) mounted to a rear end of the hammer operating means (100) and having a compressed air outlet (301) so that the compressed air that moves the piston (102) forward is discharged to the outside of the hammer operating means (100);

a magazine (500) which is mounted to the hammer operating means (100) and in which the tacker pin is stored; and a guide means (700) installed in front of the hammer through-hole (105) to align the tacker pin in front of the hammer through-hole (105) so that the tacker pin supplied from the magazine (500) is hit and fired by the forwardly moved hammer (103), the underwater air tacker (T) further comprising:

a water infiltration prevention means (1) that is a rubber O-ring installed in the hammer through-hole (105) to prevent water from infiltrating into the hammer operating means (100) through the hammer through-hole (105) while allowing the hammer (103) to pass therethrough;

a water infiltration prevention exhaust cover (2) mounted to a rear surface of the rear cover (300) and having at least two exhaust holes (21) so that the compressed air discharged through the compressed air outlet (301) is exhausted;

a compressed air discharge valve (3) mounted in the exhaust hole (21) to prevent the water from infiltrating through the exhaust holes (21) by opening the exhaust hole (21) to discharge the compressed air above a predetermined pressure when the compressed air above a predetermined pressure is discharged through the compressed air outlet (301) and closing the discharge holes (21) when a pressure of the compressed air discharged through the compressed air outlet (301) is reduced below a predetermined pressure; and a piston front-air discharge means (4) configured to allow the piston (102) to be moved forward smoothly by transferring air in the cylinder (101) disposed in front of the piston (102) into the water infiltration prevention exhaust cover (2) when the piston (102) is moved forward by a driving force of the compressed air.

2. The underwater air tacker (T) of claim 1, wherein the exhaust hole (21) comprises:

a main exhaust hole (211) formed in the water infiltration prevention exhaust cover (2) so that the compressed air is discharged therethrough;

a compressed air discharge valve fixing hole (212) which is formed with a predetermined depth in a rear surface of the water infiltration prevention exhaust cover (2), formed concentrically with the main exhaust hole (211), and has a diameter greater than that of the main exhaust hole (211) and in which the compressed air discharge valve (3) configured to open or close the main exhaust hole (211) is mounted, the compressed air discharge valve fixing hole (212) configured to discharge the compressed air discharged from the main exhaust hole (211) to the outside of the water infiltration prevention exhaust cover (2); and an annular protrusion (213) formed on a boundary line between the main exhaust hole (211) and the compressed air discharge valve fixing hole (212).

3. The underwater air tacker (T) of claim 1, wherein the piston front-air discharge means (4) comprises:

an input connector (41) that is an air transfer pipe having an inlet and an outlet, the input connector (41) installed on the hammer operating means (100) and having the inlet configured to communicate with the inside of the cylinder (101) disposed in front of the piston (102);

an output connector (42) that is an air transfer pipe having an inlet and an outlet, the output connector (42) installed on the water infiltration prevention exhaust cover (2) and having the outlet configured to communicate with the inside of the water infiltration prevention exhaust cover (2); and an air transfer means (43) that is a pipe having an inlet and an outlet, the air transfer means (43) having the inlet connected to the outlet of the input connector (41) and the outlet connected to the inlet of the output connector (42) to transfer air in the cylinder (101) transferred through the input connector (41) to the output connector (42).

* * * * *